(12) United States Patent
Sabanés et al.

(10) Patent No.: US 7,387,346 B2
(45) Date of Patent: Jun. 17, 2008

(54) WHEEL COVER FOR THE WHEELS OF A VEHICLE

(75) Inventors: José Caldés Sabanés, Barcelona (ES); Augusto Mayer Pujades, San Cugat Del Vallés (ES)

(73) Assignee: Zanini Auto Grup, S.A., Parets Del Valles (Barcelona) (ES)

( * ) Notice: Subject to any disclaimer, the term of this patent is extended or adjusted under 35 U.S.C. 154(b) by 0 days.

(21) Appl. No.: 11/506,097

(22) Filed: Aug. 17, 2006

(65) Prior Publication Data

US 2006/0279135 A1 Dec. 14, 2006

Related U.S. Application Data

(63) Continuation of application No. PCT/ES2005/000055, filed on Feb. 8, 2005.

(30) Foreign Application Priority Data

Feb. 18, 2004 (ES) .................................. 200400386

(51) Int. Cl.
*B60B 7/14* (2006.01)
(52) U.S. Cl. .............................. 301/37.373; 301/37.374
(58) Field of Classification Search ................................
301/37.372–37.376
See application file for complete search history.

(56) References Cited

U.S. PATENT DOCUMENTS

| 4,998,780 | A | * | 3/1991 | Eshler et al. | ............ | 301/37.375 |
| 5,181,767 | A | * | 1/1993 | Hudgins et al. | ........ | 301/37.375 |
| 5,667,281 | A | * | 9/1997 | Ladouceur | ............. | 301/37.375 |
| 5,918,946 | A | * | 7/1999 | DiMarco | ............... | 301/37.375 |
| 6,017,096 | A | * | 1/2000 | Russell | .................... | 301/37.36 |

* cited by examiner

*Primary Examiner*—Jason R Bellinger
(74) *Attorney, Agent, or Firm*—Klauber & Jackson LLC

(57) ABSTRACT

A wheel cover having collars (1) with elastic tabs (3) for mounting and fixing the collars on the heads of nuts or bolts (2) used to fix the wheel to a vehicle. The tabs (3) have protrusions (4) with a double ramp (5 and 5'), that are used to mount and dismount the collars (1) to the nuts or bolts (2). The collars (3) are retained by locking the protrusions (4) onto an annular projection (14) of the head of the nut or bolt. Independent caps (10) are locked by the protrusions to the collars (1) whereby the caps (10) protect and conceal the screws or heads of the bolts (2) and remain locked while being able to turn freely.

12 Claims, 5 Drawing Sheets

WHEEL COVER FOR THE WHEELS OF A VEHICLE

RELATED APPLICATIONS

The present application is a Continuation of co-pending PCT Application No. PCT/ES2005/000055, filed on Feb. 8, 2005 which in turn, claims priority from Spanish Application Serial No. P200400386, filed on Feb. 18, 2004. Applicants claim the benefits of 35 U.S.C. §120 as to the PCT application and priority under 35 U.S.C. §119 as to said Spanish application, and the entire disclosures of both applications are incorporated herein by reference in their entireties.

BACKGROUND OF THE INVENTION

One of the methods of fixing a wheel cover to the wheel of a vehicle consists of using sleeves which are embedded in respective collars provided in the wheel cover. The collars are, in turn, coupled in the recesses or cavities of the wheel where the bolts are positioned for fixing that wheel to the hub. Such sleeves usually have tabs ending in a harpoon-shape for their retention on the bolts or on projections provided in the cavities for housing the bolts. Moreover, those sleeves are provided with appropriate means, such as external projections, for retention of the wheel cover, specifically an edge which the collars of said wheel cover have for that purpose.

A retention device is described and claimed in U.S. Pat. No. 4,998,780, where the fixing of the wheel cover to the wheel of a vehicle is done by means of a kind of cap which is introduced via the collar of the wheel cover and is retained by being screwed to a tubular piece forming part of the wheel of the vehicle. This means that a fixing nut or screw for the tire is required that is threaded, and the screw, which is fixed by being screwed to the wheel itself, axially passes through the tubular piece.

The cap itself has an upper polygonal section, and also an intermediate cylindrical section in which have been provided for screwing of the cap on the piece arranged axially to the screw and forming part of the wheel.

Also, the lower part of said body, in the form of a cap, presents a series of tabs with a protrusion at the end projecting outwards which acts as a stop against the collar of the wheel cover through which passes the fixing screw, and in which is located the retention cap of the actual wheel cover.

The device of U.S. Pat. No. 4,998,780, includes the feature of having an unthreaded edge, as a consequence of which the tabs provided at the protrusioned end are free at their ends between the protrusion and the threaded zone of the cap, which permits the latter to be unscrewed with respect to the wheel in order to carry out the removal of the wheel cover. The unscrewing of the screw is carried out simultaneously with the unscrewing of the device or cap, since they are coupled in such a way that the polygonal head of the screw and the polygonal upper section of the device, or of the cap, which is the same thing, remain locked together in the direction of rotation.

Mention can likewise be made of Spanish invention patent P-200300899 referring to a wheel cover for the wheels of a vehicle, in which the wheel cover presents collars with elastic tabs which permit retention on the associated screws screwed to the wheel hub for the fixing of the wheel. Also, introduced into the collars of the wheel cover and coupled there are some sleeves which act as means of centering and of covering of the grooves established between the elastic tabs of the collars of the wheel cover.

More specifically, this Spanish invention patent is characterised by the fact of incorporating a piece in the form of a sleeve which fits tightly under pressure into each of the tubular projections or collars of the wheel cover, and is fixed to them by locking of some projections provided in the lateral surface of the additional piece or sleeve, in recesses made in the internal part of the respective tubular projection or collar. This additional piece or sleeve has an edge associated with its external opening which supports and acts as a stop against a stagger made for the purpose in the tubular projection or collar, the additional piece or sleeve also having associated with the edge of its internal opening some elastic tabs, the internal part of which defines some means of adjustment and centering for a projection provided in the associated fixing bolt, said bolt or nut being the one used normally by the vehicle manufacturer. The elastic tabs of the additional piece or sleeve externally define a means of positioning and retention for an elastic metallic compression ring, both for the flexible tabs associated with the tubular projections or collars of the wheel cover and for the actual elastic tabs of the additional piece or sleeve.

DESCRIPTION OF THE INVENTION

The wheel cover of the invention is of the type that incorporates collars with elastic tabs for its retention on the head of the bolts or nuts for fixing of the wheel of a vehicle, along with a cap associated with each of the collars for concealing and protecting the respective fixing bolt or nut for the wheel, includes the feature that the protrusion of the elastic tabs of the collars of the wheel cover for retention on the heads of the fixing bolts of the wheel has a double ramp, one ramp that permits introduction by pushing of the collars of the wheel cover on the fixing bolts of the wheel and associated locking or retention of the wheel cover, and the other ramp, for permitting removal of the wheel cover by means of pulling on it, by sliding of that second ramp via the annular projection provided on the bolts or nuts in order precisely to establish the retention or locking thereto.

In addition to the double ramp mentioned, the protrusions present a third exterior ramp, defining an axial retention stop for an open metallic ring, to maintain tension of the elastic tabs.

In this way, the double ramp protrusions permit passage through the annular ring which the heads of fixing bolts or nut for the wheel normally include, and are retained once that projection of the bolt has been passed by the protrusions of the elastic tabs, such that the wheel cover will be retained on the wheel.

The elastic tabs with the retention heels are surrounded by the metallic ring which tends to push them towards the interior in order to achieve an efficient locking, but which in turn permit the divergence of those tabs due to elasticity in order to carry out the fitting/removal of the actual wheel cover, other guide tabs are included for the protection and covering cap which will be fitted on each of the collars of the wheel cover provided precisely with the tabs.

Provided in association with these guide tabs, in their initial zone, are some windows for locking the cap, the cap having tabs provided with an external protrusion which becomes locked in those windows without any possibility of detachment, thus once the caps have been fitted on the collars of the wheel cover, said caps become locked thereto and it is necessary to remove the assembly of the wheel cover with the caps in order to be able to access the fixing bolts or nuts for the wheels.

As is conventional, the rear closing section of the caps has a polygonal shape complementary to the shape of the head of the fixing bolts or nuts for the wheel, though these polygonal shapes of the head of the bolt and end section of the caps do not become coupled when the fitting of the cap is carried out.

So, the caps are fitted and retained axially in the collars of the wheel cover, though they are allowed to rotate freely, which will prevent any attempt at unscrewing by means of rotating the caps from being able to cause the undoing of the bolt or nut to which the cap is retained with the ability to rotate freely. In this case, therefore, the upper polygonal end of the cap acts as a means of covering and protection of the fixing bolt for the wheel, but without being coupled to the polygonal head of this bolt. Said caps, in addition to protecting and concealing the nuts or heads of the fixing bolts, also conceal the grooves defined by the elastic tabs.

The removal of the wheel cover will be done by means of pulling on it towards the outside, since, by exerting an extraction force on that wheel cover, the protrusions of the elastic securing tabs will, by virtue of the double ramp of those heels, be able to slide and overcome the annular projection of the bolts or nuts, with the caps becoming released with regard to those bolts and it thereby becomes possible to remove the wheel cover jointly with its caps.

BRIEF DESCRIPTION OF THE DRAWINGS

In order to complement the description that is going to be made forthwith and with the aim of aiding a better understanding of the characteristics of the invention, this specification is accompanied by a set of drawings on the basis of which the innovations and advantages of the wheel cover for the wheels of a vehicle embodied in accordance with the object of the invention will be more easily understood.

DESCRIPTION OF THE PREFERRED EMBODIMENT

Figure 1:
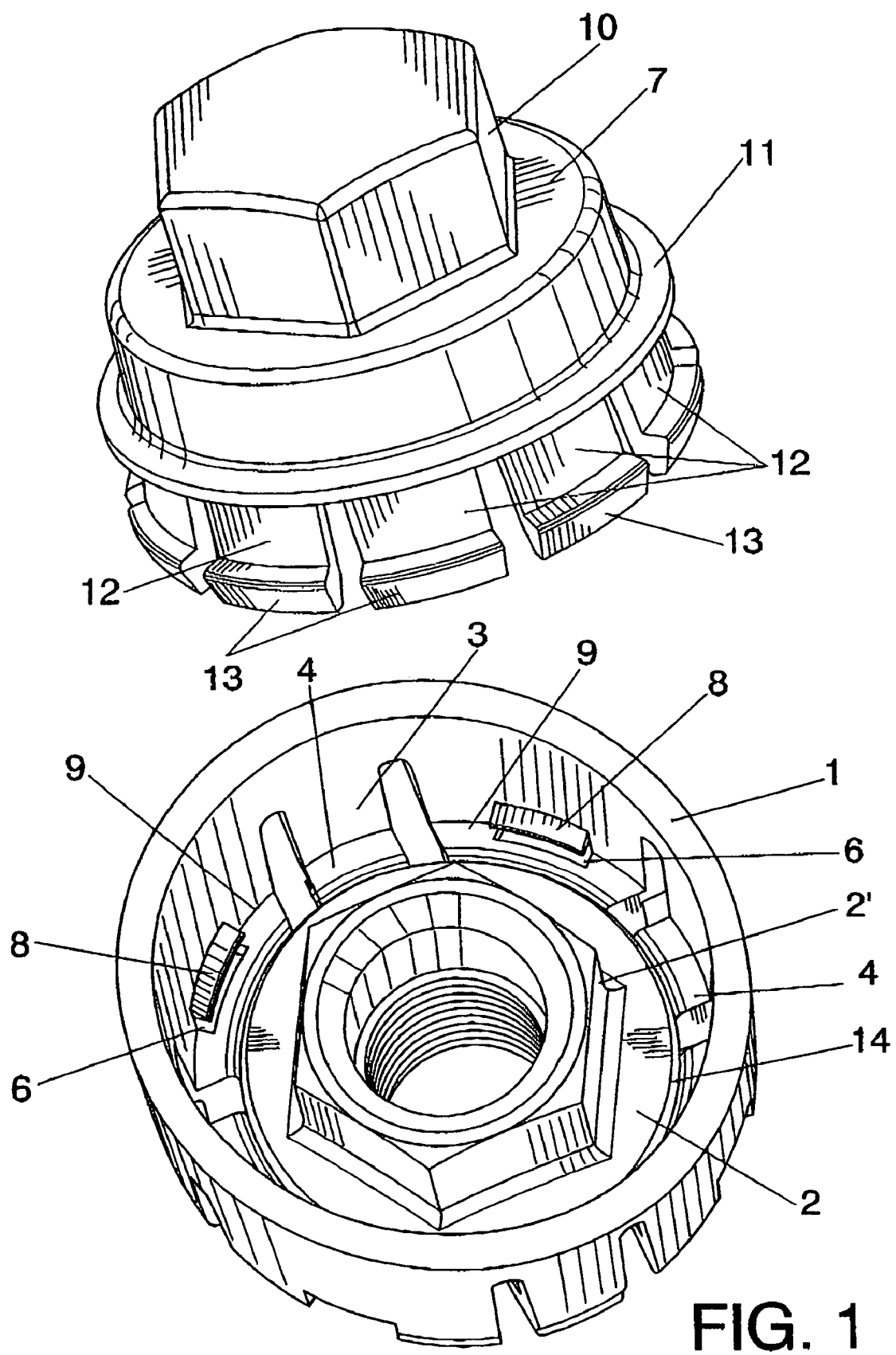
FIG. 1 shows an exploded view of the cap which has to be detached from the collar of the wheel cover coupled to the said nut or head of the screw.
Figure 2:
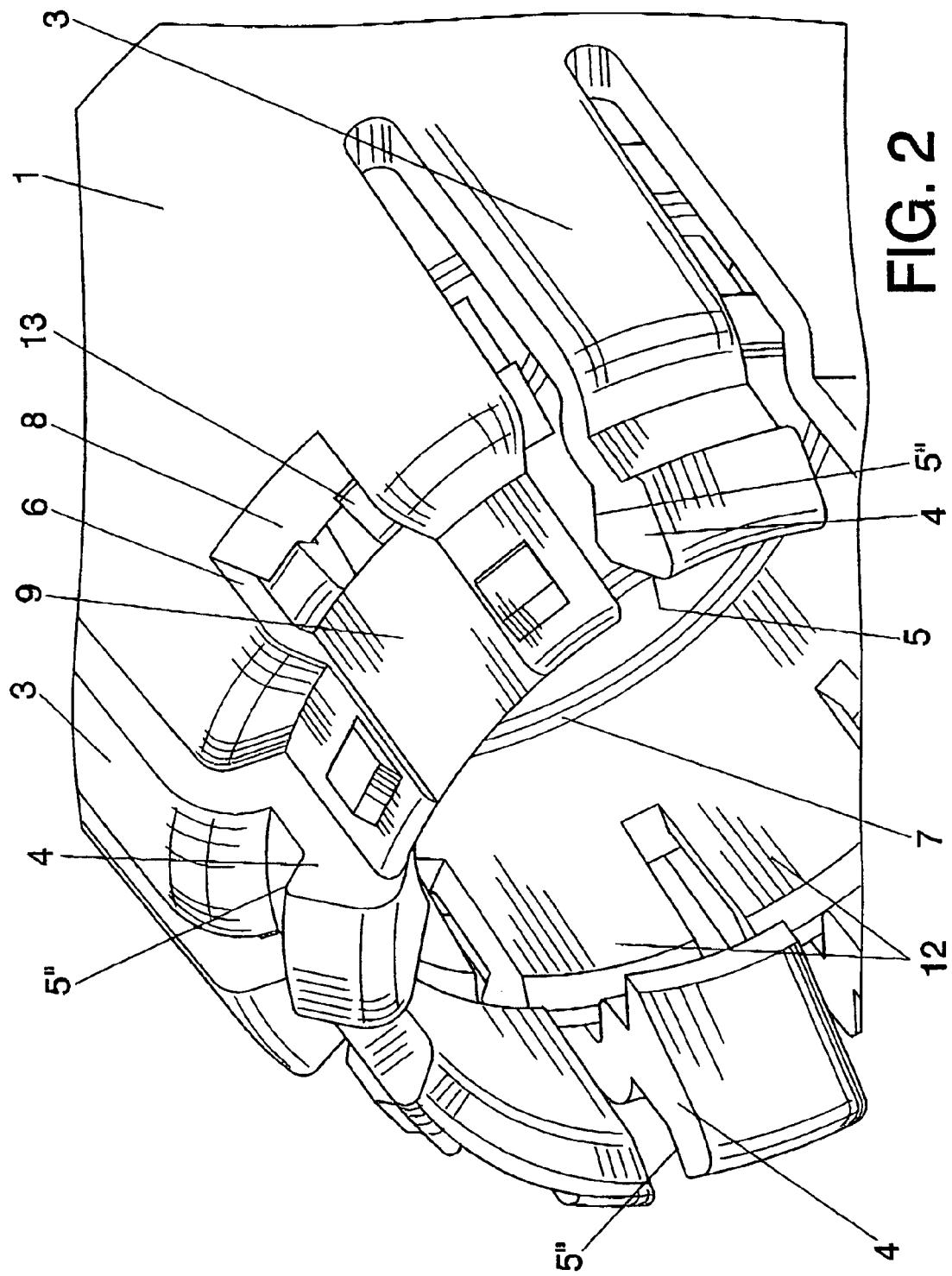
FIG. 2 shows a lower perspective view of the fitting of a cap on the associated collar of the wheel cover.

During the course of the present description, when reference is made to the fixing bolt of the wheel of a vehicle, it must be understood that the head of that bolt can equally correspond to the nut which has to screw on to the associated stud emerging from the assembly hub of the wheel for the vehicle.

So, as can be seen in the figures, the wheel cover of the invention includes, as is conventional, a plurality of collars 1, corresponding to the number of bolts 2 required for fixing of the wheel to the vehicle. The collars 1 are provided with a series of elastic tabs 3 which can be fixed and pressing towards the outside, in other words, tensioned by means of an open ring 3'. These elastic tabs 3 are provided at their ends, and following a double bend, with respective protrusions 4 with a double ramp, that is, a lower ramp 5 and an upper ramp 5', with the function that is going to be explained further below. The elastic tab 3 also includes an external ramp 5" for the retention of the metallic ring 3'.

Interspersed with the elastic tabs 3, the collar 1 of the wheel cover also has a series of tabs 9 at the start of which windows 6 have been provided for the locking of the cap 7 which has to be fitted in the collar 1 of the wheel cover, covering and protecting the polygonal head 2' which can correspond to a fixing nut or bolt 2 for the wheel of the vehicle.

Figure 3:
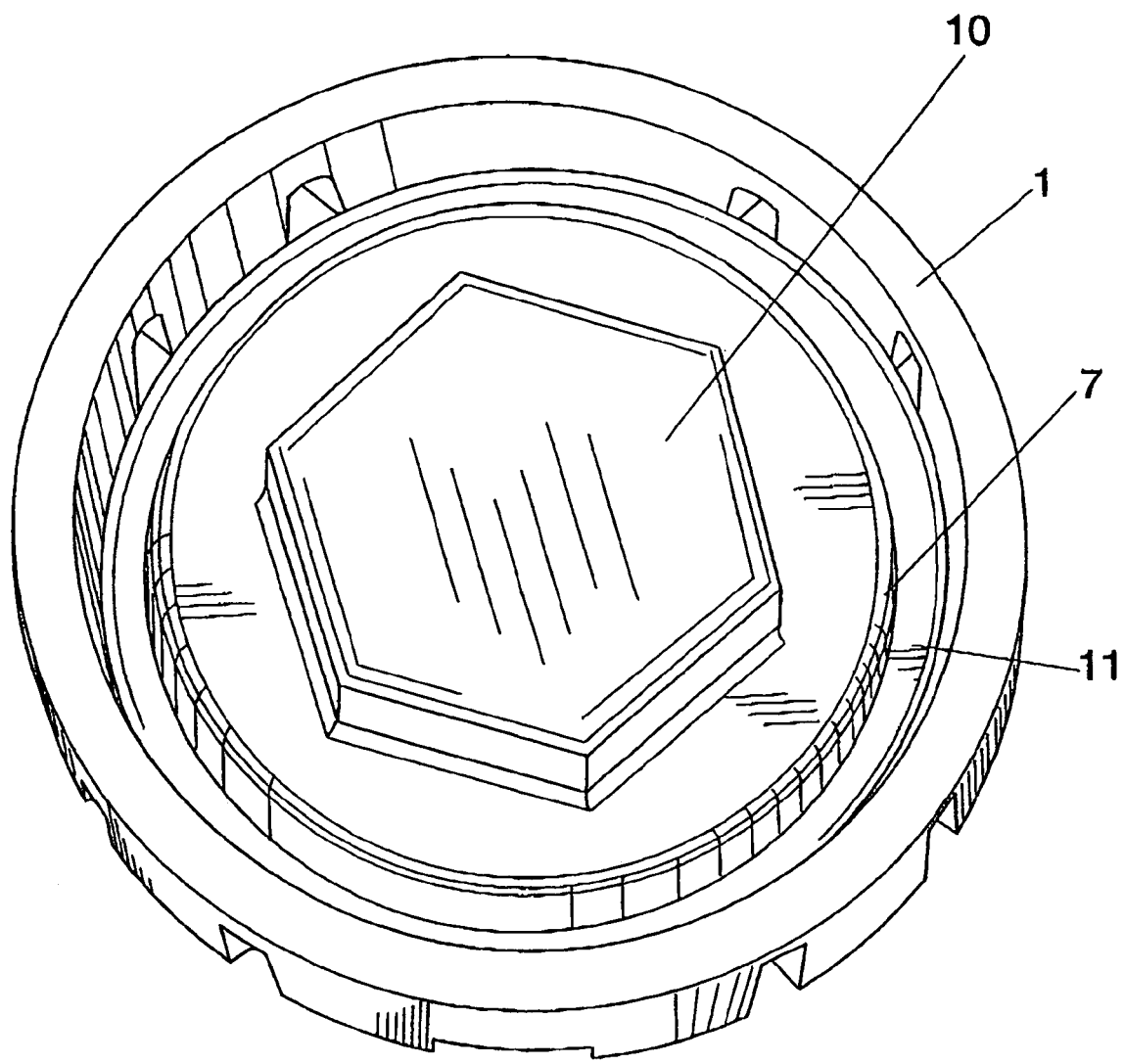
FIG. 3 shows an upper perspective view of a collar of the wheel cover with the cap fitted, showing the polygonal closing end of the cap.

Windows 6 associated with the tabs 5 present an internal projection 8, which is straight on its lower face, and which has the task of achieving the locking of the cap 7, the latter, as its conventional, having a polygonal upper closing section 10, as is clearly shown in FIGS. 1 and 3.

That cap 7, in addition to the polygonal upper closing section 10 and the associated cylindrical section 7 in FIG. 1, is also provided with an annular projection 11 and, towards its end or opening, with a plurality of tabs 12 provided with a protrusion 13, in such a way that the protrusions are positioned in association with the windows 6 of the collar 1 of the wheel cover and the protrusions 13 are locked with the projections 8 of that collar 1 of the wheel cover, thereby establishing a fastening between the cap 7 and the collar 1 of the wheel cover, without any possibility of removal due to the straight locking that is made of the protrusions 13 of the tabs 12 of the cap 7 and the projections 8.

Figure 4:
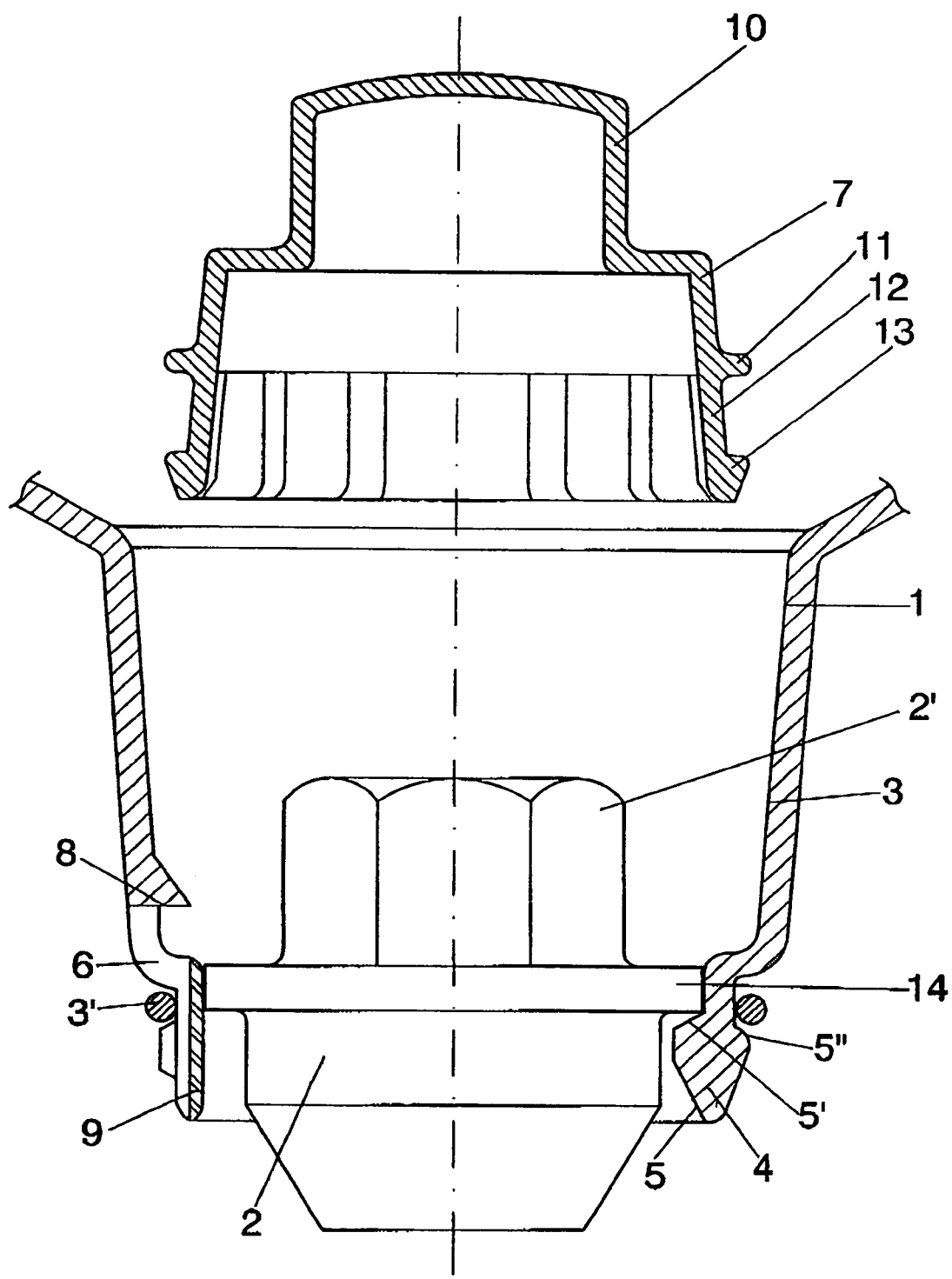
FIG. 4 shows a view in cross-section of the coupling between a collar of a wheel cover and the associated nut or head of a fixing screw for the wheel.
Figure 5:
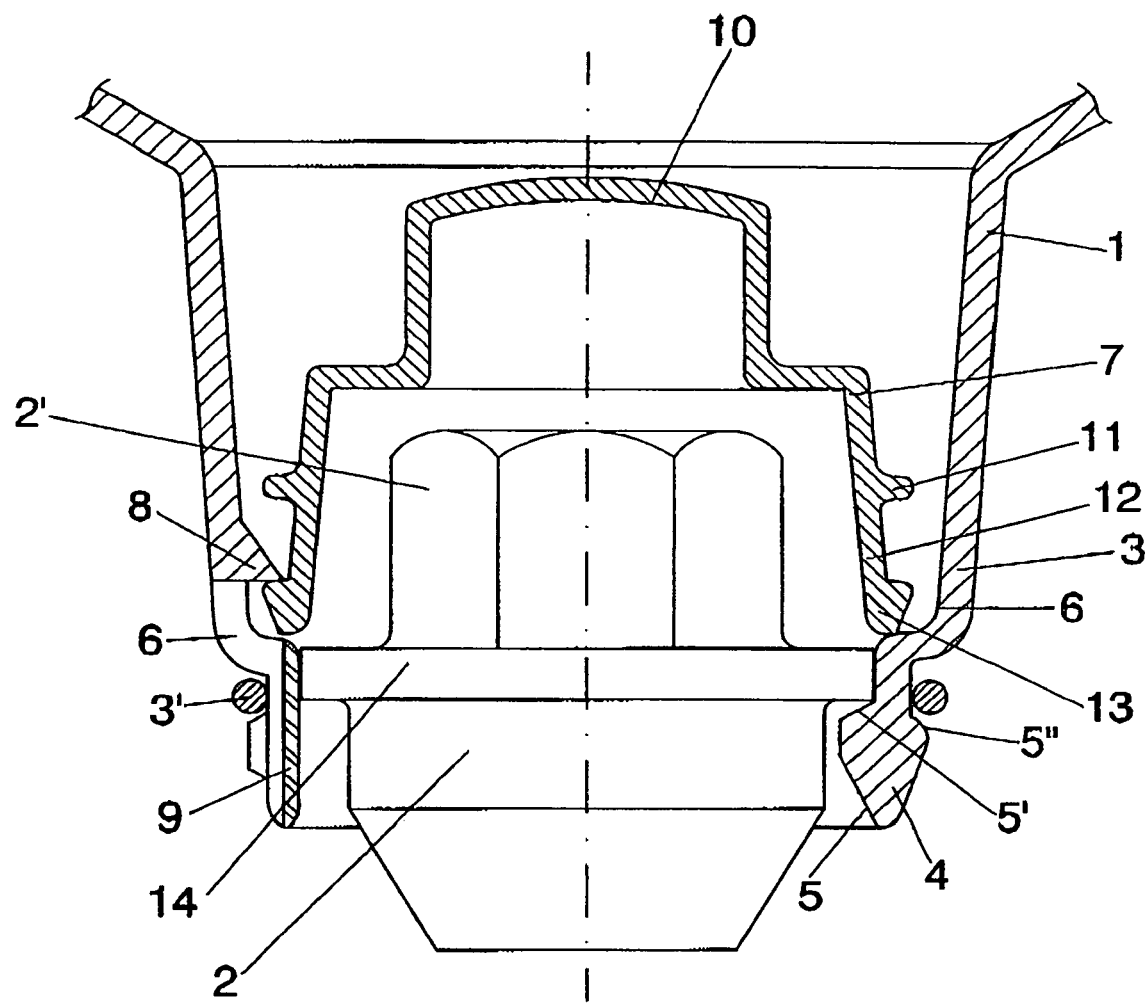
FIG. 5 shows a view like that of the previous figure with the cap fitted on the respective collar of the wheel cover.

In accordance with the description, the fitting of the wheel cover is done by coupling its collars 1 on the heads or nuts 2' of the fixing bolts 2 of the wheel, in such a way that in this coupling the ramp 5 of the protrusions 4 associated with the elastic tabs 3 of the collars 1 slide on the annular projection 14 which the head of the bolt or, as the case might be, the nut 2' has been provided with for that purpose. The locking function is illustrated in FIG. 4, wherein the cap 7 is introduced into the collar 1 until the protrusions 13 of the tabs 12 of said cap 7 become locked in the windows 6, and specifically on the projections 8 of the collar 1, with the cap 7 becoming fastened without any possibility of removal by virtue of the straight stagger defined by the locking between the projections 8 and the protrusions 13, as represented in FIG. 5, though the said cap 7 remains fitted with the ability to rotate freely.

In this way, in an attempt to rotate the caps 7, as a consequence of the fact that the polygonal section 10 of the caps 7 does not lock with the polygonal head 2' of the nut or screws 2, will result in free rotation of the cap 7 will discourage any manipulation in an attempt to remove the wheel cover, since in order to perform that removal it is necessary to pull outwardly on the wheel cover, due to the fact that the ramp 5' of the protrusion 4 permits sliding via the projection 14 associated with the nut or bolt and with it the removal of the wheel cover together with the caps 7, leaving the head 2' or nut of the bolt 2 free for carrying out the unscrewing in the event that it is wished to remove the wheel.

The invention claimed is:

1. A WHEEL COVER FOR THE WHEELS OF A VEHICLE comprising a plurality of collars (1) in association with cavities of the wheel in which nuts or bolts (2) are housed, said collars (1) being provided with elastic tabs (3) with end protrusions (4) for retaining the elastic tabs on an annular projection (14) formed on a head (2') of the nut or bolt (2), for fixing or retention of the wheel cover to the wheel, the wheel cover further including independent caps (7) which are fitted in the respective collars (1) of the wheel cover in order to cover and protect the heads of the bolts (2) or the nuts (2'), the caps having a rear closing section with a polygonal shape (10), wherein the collars (1) of the wheel cover contain windows (6) with projections (8) for locking respective protrusions (13) into tabs (12) associated with the caps (7), the caps thereby being locked without possibility of removal though with the possibility of free rotation on the collars (1) with respect to the wheel cover.

2. THE WHEEL COVER FOR THE WHEELS OF A VEHICLE, according to claim 1, wherein the protrusions (4) associated with the elastic tabs (3) of the collars (1) have a double ramp (5-5'), one of the double ramps being arranged to permit sliding on the annular projection (14) of the head (2') of the bolt (2), in the direction of axial thrust for fitting of the wheel cover, while the other of the double ramps being arranged to permit sliding on the annular projection (14) of the head (2') of the bolt (2), in the direction of axial displacement by pulling outwards, in order to remove the wheel cover together with the caps (7) coupled in the collars (1) of said wheel cover.

3. THE WHEEL COVER FOR THE WHEELS OF A VEHICLE, according to claim 2, wherein the protrusions (4) also have an exterior third ramp (5") for retention in the axial direction of a conventional metallic ring (3') provided around the elastic tabs (3) in order to maintain the tension of the elastic tabs.

4. THE WHEEL COVER FOR THE WHEELS OF A VEHICLE, according to claim 1, wherein the collars (1) also have intermediate tabs (9) for guiding the caps (7) during installation on the collars (1) of the wheel cover, and also for centering of the caps and immobilizing the caps in the direction of rotation thereof.

5. THE WHEEL COVER FOR THE WHEELS OF A VEHICLE, according to claim 1, wherein the windows (6) with the locking projections (8) are located in an initial zone of the guide tabs (9).

6. THE WHEEL COVER FOR THE WHEELS OF A VEHICLE, according to claim 1, wherein the polygonal shape (10) of the caps (7), when fitted onto the collars (1) of the wheel cover, is axially separated from the polygonal heads (2') of the nuts or bolts (2), without coupling therebetween in order to permit free rotation of the caps (7) with respect to said polygonal heads (2') of the nuts or bolts (2).

7. THE WHEEL COVER FOR THE WHEELS OF A VEHICLE, according to claim 2, wherein the collars (1) also have intermediate tabs (9) for guiding the caps (7) during installation on the collars (1) of the wheel cover, and also for centering of the caps and immobilizing the caps in the direction of rotation thereof.

8. THE WHEEL COVER FOR THE WHEELS OF A VEHICLE, according to claim 2, wherein the windows (6) with the locking projections (8) are located in an initial zone of the guide tabs (9).

9. THE WHEEL COVER FOR THE WHEELS OF A VEHICLE, according to claim 2, wherein the polygonal shape (10) of the caps (7), when fitted onto the collars (1) of the wheel cover, is axially separated from the polygonal heads (2') of the nuts or bolts (2), without coupling therebetween in order to permit free rotation of the caps (7) with respect to said polygonal heads (2') of the nuts or bolts (2).

10. THE WHEEL COVER FOR THE WHEELS OF A VEHICLE, according to claim 3, wherein the collars (1) also have intermediate tabs (9) for guiding the caps (7) during installation on the collars (1) of the wheel cover, and also for centering of the caps and immobilizing the caps in the direction of rotation thereof.

11. THE WHEEL COVER FOR THE WHEELS OF A VEHICLE, according to claim 3, wherein the windows (6) are located in an initial zone of the guide tabs (9).

12. THE WHEEL COVER FOR THE WHEELS OF A VEHICLE, according to claim 3, wherein the polygonal shape (10) of the caps (7), when fitted onto the collars (1) of the wheel cover, is axially separated from the polygonal heads (2') of the nuts or bolts (2), without coupling therebetween in order to permit free rotation of the caps (7) with respect to said polygonal heads (2') of the nuts or bolts (2).

* * * * *